Dec. 19, 1939.    C. M. ROAN ET AL    2,183,622
DIRECTION TURN INDICATOR FOR VEHICLES
Filed May 31, 1938    2 Sheets-Sheet 1
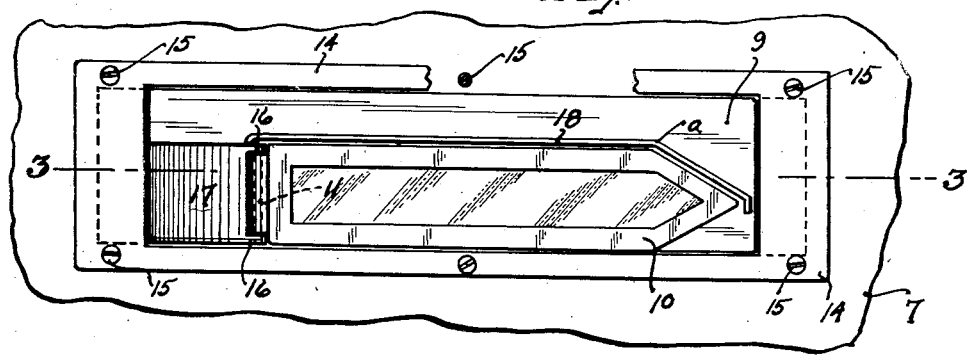
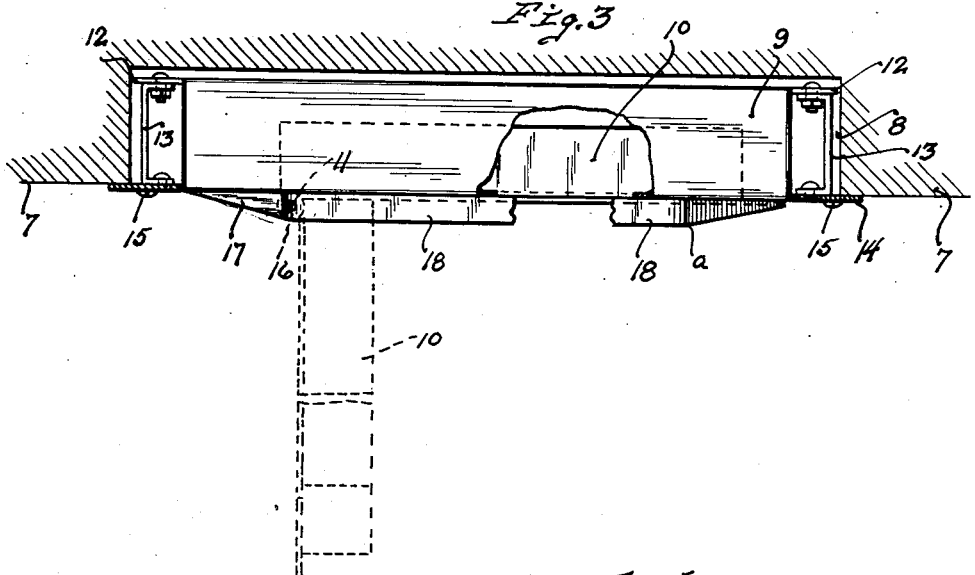
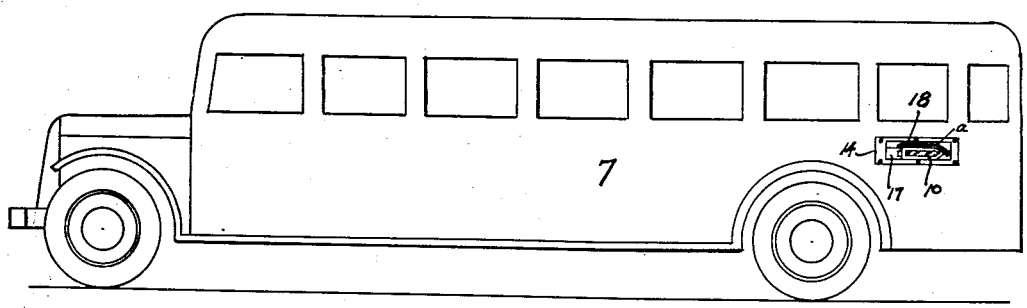
Inventors
Carl M. Roan
Oliver E. Kaupang
Arthur W. Rohlen
By their Attorneys Dec. 19, 1939.  C. M. ROAN ET AL  2,183,622
DIRECTION TURN INDICATOR FOR VEHICLES
Filed May 31, 1938  2 Sheets-Sheet 2
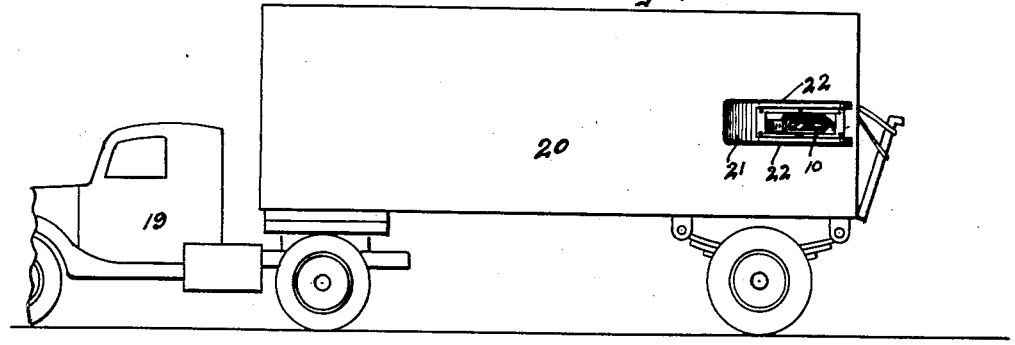
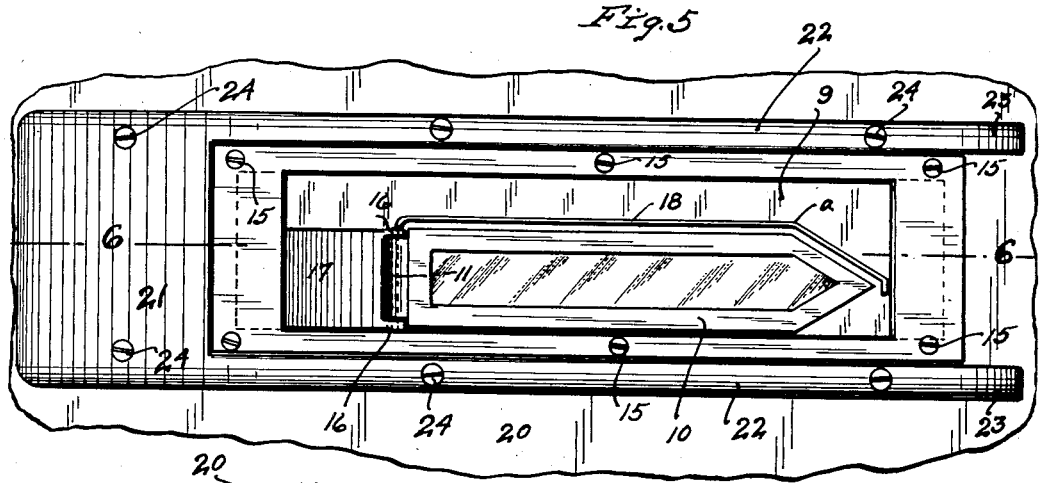
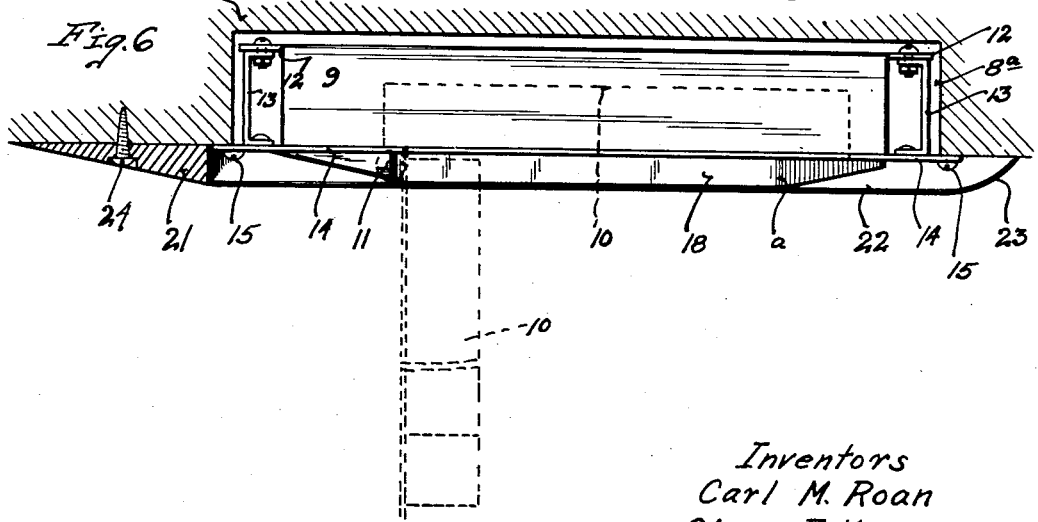
Inventors
Carl M. Roan
Oliver E. Kaupang
Arthur W. Rohlen
By their Attorneys Patented Dec. 19, 1939

2,183,622

UNITED STATES PATENT OFFICE 2,183,622

DIRECTION TURN INDICATOR FOR VEHICLES

Carl M. Roan, Oliver E. Kaupang and Arthur W. Rohlen, Minneapolis, Minn., assignors to Beacon Safety Signal Co.

Application May 31, 1938, Serial No. 210,833

5 Claims. (Cl. 116—52)

Our present invention relates to direction turn indicators for vehicles such, for example, as that disclosed and claimed by us in our prior Patent No. 2,155,617 entitled "Direction turn indicator for vehicles". In the application of "Direction turn indicator for vehicles" and especially in the use thereof on busses, large trucks, truck trailers, and the like which frequently must make deliveries through crowded alleys and narrow passages, frequent scraping of the side walls of the vehicle or trailer is unavoidable. Such scraping of the side walls often tears loose or greatly damages direction turn indicators applied to such vehicles.

Our invention provides extremely simple and highly efficient means for protecting direction turn indicators applied to vehicles in the above noted or similar manner; and, generally stated, it consists of the novel device, combinations of devices, and arrangement of parts hereinafter described and defined in the claims.

In the accompanying drawings which illustrate the invention like characters indicate like parts throughout the several views.

Referring to the drawings:

Fig. 1 is a side elevation showing one form of the improved device applied to what is indicated as a bus;

Fig. 2 is a side elevation illustrating the invention on a larger scale than Fig. 1, some parts being broken away;

Fig. 3 is a view chiefly in horizontal section taken on the line 3—3 of Fig. 2, but with some parts shown in full and some parts broken away;

Fig. 4 is a view in side elevation illustrating a modified form of the invention applied to a truck trailer;

Fig. 5 is a side elevation showing the indicator illustrated in Fig. 4; and

Fig. 6 is a view chiefly sectioned on the line 6—6 of Fig. 5, but with some parts shown in full.

Referring first to the structure illustrated in Figs. 1, 2 and 3, the numeral 7 indicates the body of the bus that is recessed at 8 to receive the direction turn indicator, as shown, applied at the rear of the left hand side of the bus body. As illustrated in the drawings, the direction turn indicator preferably is of the form and construction illustrated in our patent above identified; and hence, for the purpose of this case, it is only necessary to briefly indicate the parts thereof as follows.

The numeral 9 indicates the casing of the indicator and the numeral 10, the signal arm that is pivoted thereto at 11 and adapted to be moved from its normal position within the casing, indicated by full lines in Fig. 3, into the operative or projected position, indicated by dotted lines in said view. The casing 9, as shown, is provided at its ends with projecting ears 12 secured to the inner ends of anchoring brackets 13, the outer ends of which latter are riveted or otherwise rigidly secured to a marginal anchoring frame 14, rigidly but detachably secured to the body 7 by suitable means such as screws 15. The anchoring frame 14 will be nearly or quite flush with the outer surface of the vehicle body. The anchoring frame 14 when applied as shown in the drawings, then constitutes an outer face portion of the casing of the signal device.

It is important to note, see particularly Fig. 3, that the hinge connection 11 is made to lugs 16 formed at the rear ends of a wedge-shaped cam lug or surface 17. This cam surface or lug 17, as shown, is formed as a part of or otherwise rigidly secured to the front end of the outer face of the casing 9, by a hinge 11, and it extends obliquely outward from the face of the anchoring frame 14 to the outer extremities of the lugs 16.

Formed on or rigidly secured to the outer face of the casing 9 and extending longitudinally thereof above the arm 10 is a rail-like guard flange 18 that serves also as an eave flange to keep moisture from running down between the outer face of the casing and signal arm. The outer edge of the flange 18 extends above but in vertical line with the outermost portions of the lugs 16 and cam surface 17 and to a point marked a on Figs. 2 and 3, and it is parallel to the outer face of the casing and to the outer face of the adjacent side of the vehicle body. Rearward of the point a the guard flange 18 extends obliquely backward and, preferably also, obliquely downward and terminates approximately in a plane of the outer face of the anchoring frame 14.

With the arrangement described any objects that tend to scrape the side of the vehicle along the outer surface of the indicator will come in contact with the cam surface 17 and be pressed outward of the hinge lugs 16, so that the guard rail 18 will then keep the object pressed away from the face of the indicator until the indicator has passed the same.

In backing up, the oblique rear end of the rail 18 will tend to press any objects outward and prevent damage to the indicator. It will, of course, be understood that in backing up, the signal arm 10 will always be closed or within the casing.

In the arrangement illustrated in Figs. 4, 5 and 6, the numeral 19 indicates a tractor vehicle, and 20, a commercial truck trailer, which latter, at its rear end, has a cavity 8a to receive the indicator. The direction turn indicator illustrated in these views is assumed to be the same as that illustrated in Figs. 1, 2 and 3, and the same parts are here indicated by the same characters that were used in Figs. 1, 2 and 3. Also heretofore described elements 11, 12, 13, 14, 15, 16, 17 and 18 are the same as previously described, and hence, are indicated by the same characters.

The guard means here employed, while capable of more general use, has been especially designed for application to trucks and truck trailers that must make delivery through alleys or narrow passages where the sides of the vehicle are likely to be scraped against the sides of buildings or like obstructions, and it further comprises a very strong and rigid guard frame which, in its preferred form, comprises a wedge-shaped end 21 and upper and lower rails 22, the rear ends of which latter are beveled at 23. This guard 21—22, as shown, is rigidly secured to the side of the trailer body by means of screws 24, but obviously may be otherwise secured. When applied, its wedge-shaped or beveled front end 21 stands in front of the outer face of the indicator casing 9, and its rails 22 extend one above and one below the said casing. Obviously the outermost faces of the surface 21 and rails 22 are outward of all the projections of the indicator casing, and preferably they are slightly farther out than the outer edge of the guard flange 18 but may be in the vertical line thereof.

As evident, any obstructions striking against the side of the vehicle in front of the indicator will be pressed outward first by the surface 21 and will then be held outward by the rails 22, assisted more or less by the guard flange 18. In this way the indicator is well protected against scraping actions.

It should be further noted that in the arrangement of the indicator illustrated the arm 10 will be forced to a closed position if engaged by an obstruction while projected. The guard means illustrated positively insures that any scraping or accidental contact with the projected arm 10 under forward movement of the vehicle will be directed outward of the pivot 11, so that the said arm will be forced to its retracted position within the casing without damage thereto. Attention is further called to the fact that the so-called guard flange 18, located as it is, just above the opening of the casing that passes the arm 10 therethrough, serves as an eave flange to reflect rain and the like outward. This statement applies to both of the arrangements illustrated. In the structure illustrated in Figs. 4, 5 and 6, the upper rail 22 consists in performing a similar function.

In the drawings we have illustrated the preferred means for accomplishing the results set forth, but it will be understood that the device described is capable of modification within the scope of the invention herein disclosed and claimed.

What we claim is:

1. In a direction turn indicator, a casing, a signal arm connected to said casing by a hinge located outward of the face of said casing, said casing on its outer face having a rearwardly and outwardly inclined cam surface, a longitudinally extended guard rail, and a rearwardly and outwardly oblique front end cam surface, which cam surface and the outer edge of said guard rail extend outward of the hinge connection between said casing and arm.

2. The combination with a vehicle body having a signal arm vertically pivotally mounted on one side of the vehicle body for movements from an inoperative retracted position parallel to the side of the vehicle body to a projected operative position wherein it is disposed substantially at a right angle to the side of the vehicle body, said signal arm being pivotally mounted by means of a hinge projecting outwardly of the side of the vehicle body, of a guard for the signal arm comprising a cam-acting portion mounted on the vehicle body forward of the signal arm and extending obliquely rearwardly and outwardly from the face of the vehicle body to a plane outwardly of the signal arm hinge, and a guide rail mounted on the vehicle body in laterally spaced parallel relation to the retracted body of the signal arm and extending rearwardly from the outermost portion of the oblique front cam surface.

3. The structure defined in claim 2 in which the said oblique cam-acting surface is wider than the signal arm and in which there are two of said longitudinal guide rails, one being above and one being below the signal arm.

4. In a direction turn indicator, a horizontally disposed casing having an elongated signal arm-receiving opening in its outer face, a signal arm pivotally mounted on the casing for movements from a retracted position within the casing to an extended operative position wherein it projects at a substantially right angle to the casing, said signal arm being mounted on the casing by means of a vertical axis hinge located at the forward end of the signal arm opening, said hinge extending outwardly of the face of the casing and comprising cooperating hinge lugs on the casing and on the signal arm, the hinge lugs of the casing being formed as part of a rearwardly and outwardly inclined cam element that is rigid on the casing forward of the signal arm.

5. The structure defined in claim 4 in further combination with a longitudinally extended rail-like guard flange mounted on the outer face of the casing above the signal arm opening and having its outer edge aligned with the outermost portion of the hinge.

CARL M. ROAN.
OLIVER E. KAUPANG.
ARTHUR W. ROHLEN.